United States Patent
Clevy et al.

(10) Patent No.: US 9,374,377 B2
(45) Date of Patent: Jun. 21, 2016

(54) MANDATORY PROTECTION CONTROL IN VIRTUAL MACHINES

(71) Applicant: Alcatel Lucent, Boulogne Billancourt (FR)

(72) Inventors: Laurent Clevy, Nozay (FR); Benjamin Venelle, Nozay (FR); Christian Toinard, Bourges (FR); Jeremy Briffaut, Soulangis (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/413,247

(22) PCT Filed: Jul. 9, 2013

(86) PCT No.: PCT/EP2013/064475
§ 371 (c)(1),
(2) Date: Jan. 7, 2015

(87) PCT Pub. No.: WO2014/019815
PCT Pub. Date: Feb. 6, 2014

(65) Prior Publication Data
US 2015/0128209 A1    May 7, 2015

(30) Foreign Application Priority Data

Aug. 3, 2012 (EP) .................................. 12179254

(51) Int. Cl.
*H04L 29/06* (2006.01)
*G06F 21/53* (2013.01)
(Continued)

(52) U.S. Cl.
CPC ............... *H04L 63/10* (2013.01); *G06F 21/53* (2013.01); *G06F 21/54* (2013.01); *G06F 21/6218* (2013.01); *G06F 2221/2113* (2013.01)

(58) Field of Classification Search
CPC ..... H04L 63/10; G06F 21/6218; G06F 21/53; G06F 21/54; G06F 2221/2113
See application file for complete search history.

(56) References Cited

U.S. PATENT DOCUMENTS

| 2005/0182958 A1* | 8/2005 | Pham ...................... G06F 21/51 726/22 |
| 2006/0143704 A1* | 6/2006 | Rits ....................... G06F 21/629 726/17 |

(Continued)

FOREIGN PATENT DOCUMENTS

| EP | 2159729 | 3/2010 |
| EP | 2166478 | 3/2010 |

(Continued)

OTHER PUBLICATIONS

Lee et al., A Multi-Layer Mandatory Access Control Mechanism for Mobile Devices Based on Virtualization, Jan. 2008, 5th IEEE Consumer Communications and Networking Conference, pp. 251-256.*

(Continued)

*Primary Examiner* — Kenneth Chang
(74) *Attorney, Agent, or Firm* — Patti & Malvone Law Group, LLC

(57) ABSTRACT

A method and system for authenticating a user to provide access to a secure application configured on a mobile device are disclosed. The method includes receiving an input from the user. The input is associated with a plurality of parameters. The method includes extracting a biometric pattern based on the input. The biometric pattern may be generated from the plurality of parameters associated with the input. The method may include comparing the biometric pattern with a plurality of reference patterns. The plurality of reference patterns are pre-defined by an owner of the mobile device. Furthermore, the method may include authenticating the user when the biometric pattern matches a reference pattern associated with the secure application from the plurality of reference patterns. Moreover, the method includes allowing the user to access the secure application, based on the authentication.

13 Claims, 2 Drawing Sheets

(51) Int. Cl.
*G06F 21/54* (2013.01)
*G06F 21/62* (2013.01)

(56) References Cited

U.S. PATENT DOCUMENTS

| | | | | |
|---|---|---|---|---|
| 2007/0180450 | A1* | 8/2007 | Croft | G06F 3/1415 718/1 |
| 2008/0127109 | A1* | 5/2008 | Simeon | G06F 11/3409 717/128 |
| 2009/0319529 | A1* | 12/2009 | Bartlett | G06F 21/6218 |
| 2010/0058340 | A1* | 3/2010 | Kamada | G06F 21/6218 718/1 |
| 2010/0132011 | A1* | 5/2010 | Morris | G06F 9/45537 726/1 |
| 2011/0072487 | A1* | 3/2011 | Hadar | G06F 9/5072 726/1 |
| 2011/0126281 | A1 | 5/2011 | Ben-Zvi et al. | |
| 2011/0225624 | A1* | 9/2011 | Sawhney | G06F 21/53 726/1 |
| 2012/0017213 | A1* | 1/2012 | Hunt | G06F 21/53 718/100 |
| 2013/0031602 | A1* | 1/2013 | Kimizuka | G06F 21/6209 726/1 |

FOREIGN PATENT DOCUMENTS

| | | |
|---|---|---|
| JP | 2002149494 | 5/2002 |
| JP | 2006155416 | 6/2006 |
| JP | 2010055224 | 3/2010 |
| WO | 2009102006 | 8/2009 |
| WO | 2011062743 | 5/2011 |

OTHER PUBLICATIONS

Haldar, V. et al; Mandatory Access Control at the Object level in the Java Virtual Machine; Technical Report No. 04-06; Department of Information and Computer Science; University of California; Apr. 30, 2004; XP055042104; Irvine, USA.

* cited by examiner

MANDATORY PROTECTION CONTROL IN VIRTUAL MACHINES

FIELD OF THE INVENTION

The present invention relates to virtual machines, and more particularly to security control in virtual machines.

BACKGROUND

It becomes very difficult to apply information security to a whole system because the software ecosystem is becoming more and more complex. Indeed, nowadays it is rare to build a machine software stack only by using in-house software; it is common to combine open sources software, commercial software and in-house solutions, all with very different know-how and skills about secure development and design. As a consequence, a single failure in the design, development, deployment and maintenance activities may introduce a security breach. Additionally, software vulnerabilities are more on more highlighted at the application level, on the client side (Flash plug-in, Acrobat Reader, Internet Browsers, Smartphones Apps), as well as on the server side (machine virtualization, application servers (PHP, Java, .Net), Web middleware, Databases).

For a long time, Discretionary Access Control (DAC) has been used. This approach is user or role based, that is why if root/admin access is gained by an attacker, the overall access control becomes useless. To cope up with this problem, Mandatory Access Control (MAC) has been designed. Mandatory Access Control is a security approach to enforce operating system authorization by forcing access request checking. This is done in regards to a security policy independent from system users.

One MAC implementation, SElinux, can be applied at system level to enforce Security Policies, regardless the user identity. Even an illegitimate "root" can be blocked by MAC. Windows Vista and Seven now include MAC by default, and administration tasks must be explicitly defined or approved.

However, this type of access control is not efficient for ensuring security into virtual machines, for example Java Virtual Machines (JVM). Indeed, the JVM process is like a black box to the system that is why it is often impossible for the system to distinguish between malicious and legitimate activities in the JVM. Java Authentication and Authorization Service (JAAS) is classically used for ensuring security in the JVM, but this security mechanism is not mandatory and is only a perimeter protection between the JVM and the system.

SUMMARY

It is an object of the invention to describe a security model to provide Mandatory Access Control model which applies to a virtual machine.

To this end, the invention provides a method for ensuring Mandatory Access Control in a virtual machine adapted for running object oriented programs and based on strongly typed language, by means of a mandatory access control module, said method comprising:
  configuring the mandatory access control module with an access policy;
  upon event reception indicating a method invocation or an access request to a variable member, adding an access control label to the object calling the method or requesting the access, named "caller", and the object called by the method or whose access is requested, named "callee", according to the caller and callee language types;
  making a decision of blocking the execution of the method or the access to the variable member, named "negative decision", or a decision of letting the virtual machine run the method or access the variable member, named "positive decision", according to said access control labels, the instance numbers of the caller and the callee, and the access policy;
  transmitting said decision to the virtual machine to block or grant the corresponding access attempt.

According to not limited embodiments, the method can comprise one or more of the following additional characteristics:
  the step of configuring the mandatory access control module is realized upon reception of an event indicating a launch or an initialization (VM_start, VM_init) of the virtual machine.
  events are standardized instrumentation oriented events which activate callback functions.
  an event reception directly modifies the virtual machine internals.
  the step of configuring the mandatory access control module comprises loading a label policy file defining correspondences between language types and access control labels, and the step of adding a label is realized by means of said label policy file.
  the step of adding an access control label comprises using an external database comprising correspondences between object instances and access control labels.
  the step of making a decision is realized by cooperation between the mandatory access control module and an external decision engine.
  the method comprises a step of recording in an external database:
    information about the invocated method;
    information about the caller and the caller, for example their language types and their access control labels, their instances numbers;
    the decision made.
  the method comprises a step of raising an exception by the virtual machine in case of negative decision, for blocking the execution of the requested method or the access to the variable member.

In addition, there is provided a mandatory access control module for ensuring Mandatory Access Control in a virtual machine adapted for running object oriented programs and bases on strongly typed language, comprising:
  a reference monitor, which is the mandatory path for methods invocation and variable member access, adapted for transmitting a decision to the virtual machine of blocking the execution of said method or said access to the variable member, named "negative decision", or a decision of letting the virtual machine run said method or access said variable member, named "positive decision";
  a labeling engine adapted for adding an access control label to the object calling the method or requesting the access, named "caller", and the object called by the method or whose access is requested, named "callee", according to the caller and callee language types;
  a decision engine adapted for making said decision, according to said labels, the instance numbers of the caller and the callee, and the access policy.

According to a not limited embodiment, the mandatory access control module can comprise one or more of the following additional characteristics:

- the mandatory access control module is a module partially external to the virtual machine, named instrumentation module, adapted for communicating with the virtual machine via standard protocols and a standard instrumentation interface.
- the labeling engine is adapted for communicating with the virtual machine for requiring the caller and callee language types.
- the label engine is adapted for communicating with an external database comprising correspondences between object instances and access control labels.
- the decision engine is adapted for communicating with an external decision engine, and waiting for an external decision from the decision engine to make a positive or a negative decision.
- the mandatory access control module comprises a trace engine adapted for recording information about the invocated method, for example language types and access control labels of the caller and the callee, their instances numbers, and the decision made, in an external database.

BRIEF DESCRIPTION OF THE DRAWINGS

Some embodiments of apparatus and/or methods in accordance with embodiments of the present invention are now described, by way of example only, and with reference to the accompanying drawings, in which.

DESCRIPTION OF EMBODIMENTS

In the following description, well-known functions or constructions by the man skilled in the art are not described in detail since they would obscure the invention in unnecessary detail.

Figure 1:
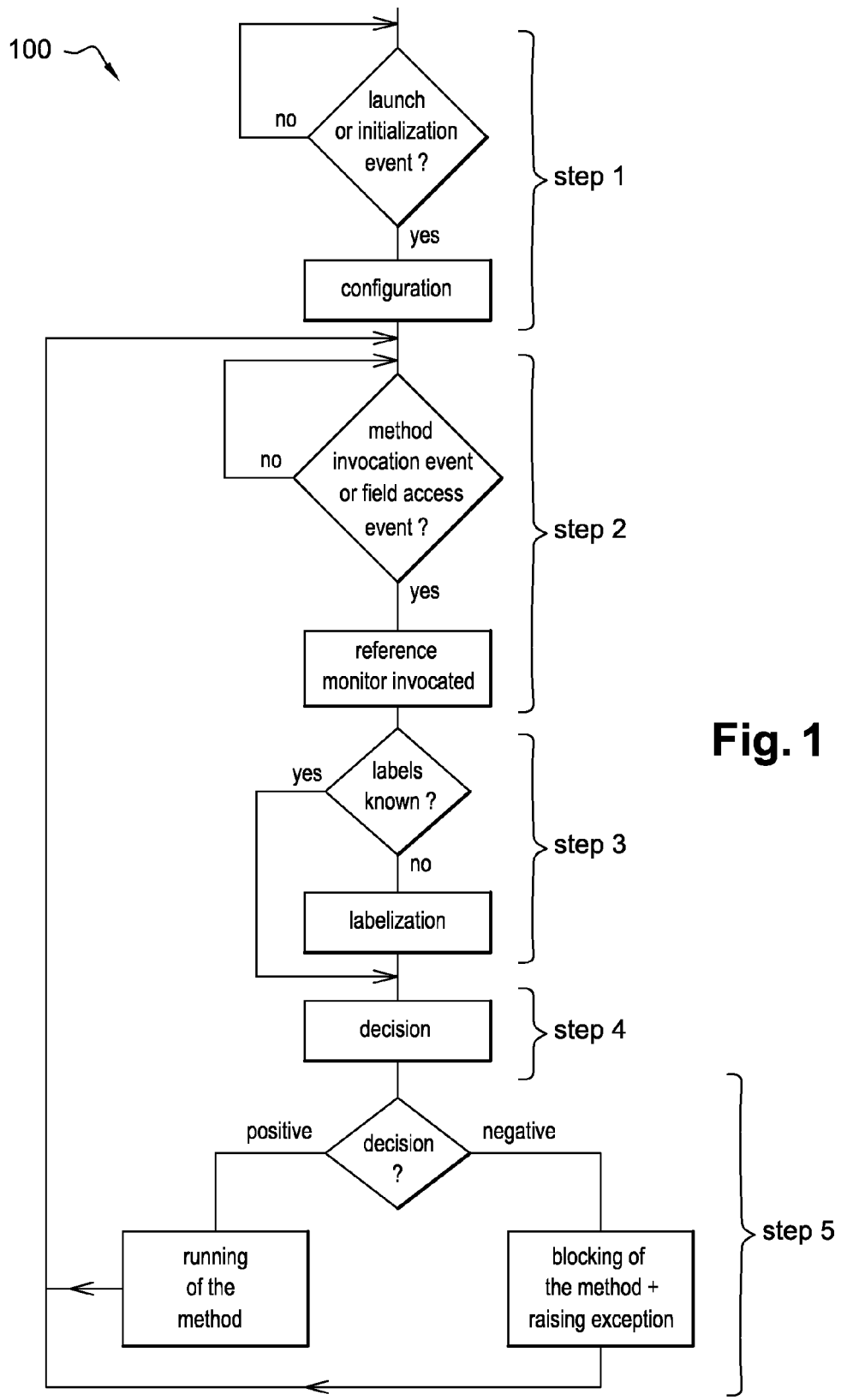
FIG. 1 shows a flowchart which schematically illustrates a method according to a non limited embodiment of the invention.

FIG. 1 shows a flowchart illustrating a method 100 according to a not limited embodiment of the invention. This method 100 aims at ensuring Mandatory Access Control in a virtual machine adapted for running object oriented programs and based on strongly typed language. More particularly, the method 100 aims at blocking the execution of a method from a first object by said virtual machine, or an access to a variable member from a second object, different from the previous one, if policy is not respected.

This principle can be applied to any virtual machine VM based system, for example Java Virtual Machine (JVM), Dalvik, Python or PHP, provided that a reference monitor can be implemented, the related language is objet oriented, and methods invocation or field member accesses can be intercepted and blocked.

Figure 2:
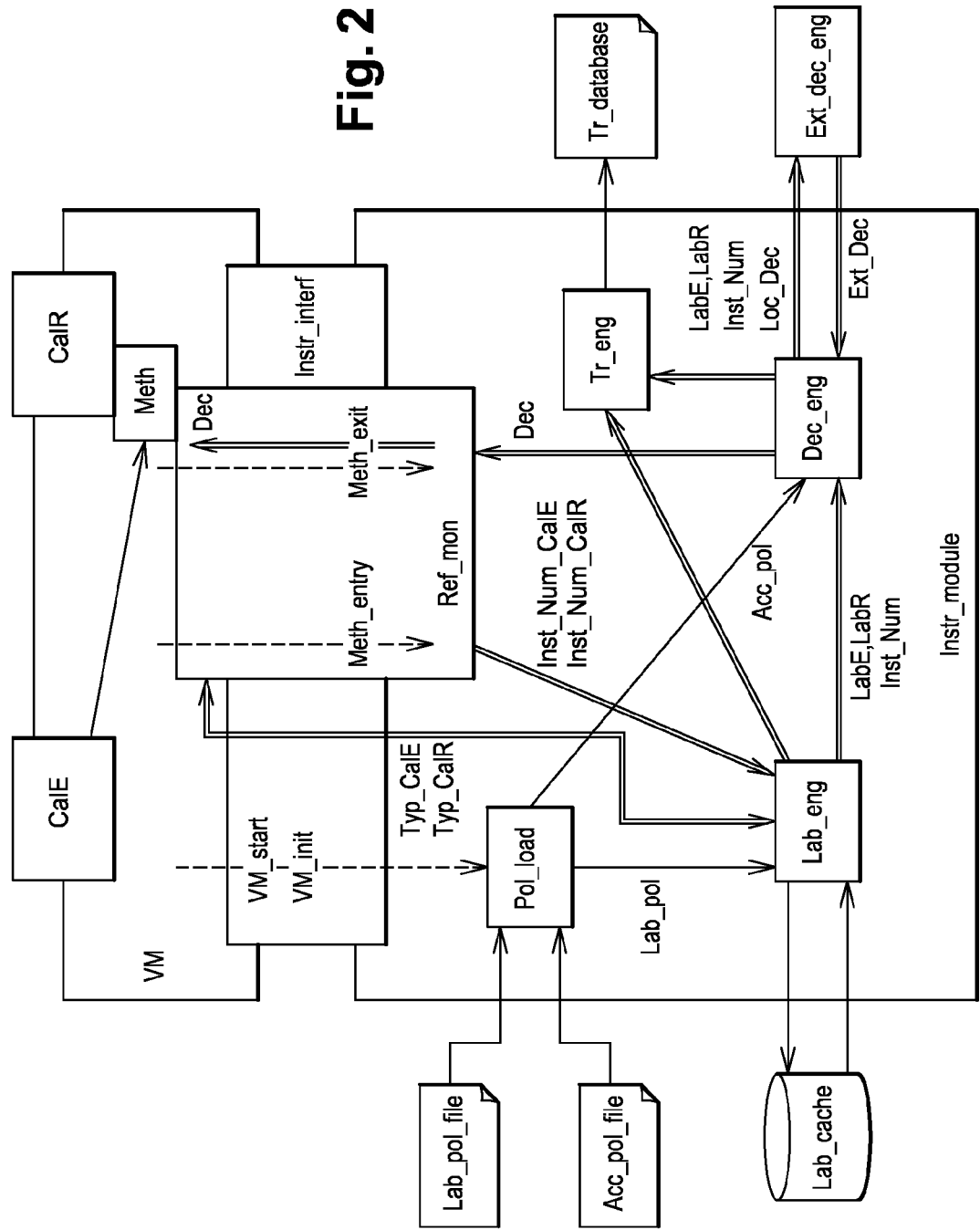
FIG. 2 schematically illustrates a mandatory access control module according to a non limited embodiment of the invention.

As represented in FIG. 2, the method 100 is performed by a mandatory access control module Instr_module which is, in this not limited embodiment, a module partially external to the virtual machine VM. Using an external module avoids modifying the virtual machine VM. In this configuration, a standardized interface Instr_Interf between the virtual machine VM and the mandatory access control module Instr_module is used. The control module Instr_module needs to take out a subscription to some events, at least events indicating a launch VM_start or an initialization VM_init of the virtual machine VM, and events indicating a method invocation Meth_entry or an access request to a variable member.

It is to be noted that in another not detailed embodiment, the mandatory access control module is completely included in the virtual machine VM. Including the control module into the virtual machine permits to improve performances and reduces response time.

In the detailed embodiment, the control module Instr_module comprises several modules communicating between each other, whose functionalities are explained further:

- a reference monitor Ref_mon;
- a policy loader module Pol_load;
- a labeling engine Lab_eng;
- a decision engine Dec_eng;
- a trace engine Tr_eng.

The method 100 comprises:

In a step 1, once the virtual machine VM is ready to execute a user's program, it raises a launch event VM_start or an initialization event VM_init, which triggers the configuration of the control module Instr_module. More precisely, an access policy file Acc_rul_file defining an access policy Acc_pol, and a label policy file Lab_pol_file defining a labeling policy Lab_pol, are loaded by a policy loader module Pol_load. The notions of access policy Acc_pol et label policy Lab_pol are explained further.

In a step 2, upon an event indicating a method invocation Meth_entry or an access request to a variable member, the reference monitor Ref_mon is invoked. FIGS. 1 and 2 deal with the case of a method Meth invocated by an object named caller CalR, and calling an object named callee CalE.

The reference monitor Ref_mon is a mandatory path when a method is invocated of when an access to a variable member is requested: this is necessary to implement mandatory access control within the virtual machine VM. The reference monitor Ref_mon identifies the caller CalR and the callee CalE to deduce security contexts from their type signatures and the requested permission.

It is to be noted that the reference monitor Ref_mon as defined by James P. Anderson is a validation mechanism which mediates access requests between entities to enforce an access control policy. By definition, a reference monitor is mandatory, tamperproof, and small enough to be formally proven.

In a step 3, the labeling engine Lab_eng is initiated. The labeling engine Lab_eng aims at adding access control labels LabE and LabR on the callee CalE and the caller CalR. A label is a unique security identifier which points out a set of entities with the same security requirements. A labeling mechanism associates an entity to a predefined label. Labelization is carried out according to the labeling policy Lab_pol. For example, the labeling policy can be based on the language's inheritance principles. This means that the security label of a given class is inherited from its super-class one by default.

In this not limited embodiment, the labeling engine Lab_eng first asks an external database Lab_cache, said database comprising correspondences between object instances and access control labels, if labels of the caller CalR and the callee CalE are known. This step is optional but improves performance if the caller CalR and the CalE have previously been involved in a method invocation. If the external database Lab_cache does not have stored the desired labels, the labeling engine Lab_eng adds control label LabE and LabR to the caller CalR and the CalE according to their types Typ_CalR, Typ_CalE. Indeed, the label policy Lab_Pol defines correspondences between language types with access control labels. Then, the labeling engine Lab_eng stores correspondences in the external database Lab_cache.

In a step 4, the decision engine Dec_eng is initiated to make a decision Dec of blocking the execution of the method Meth, named "negative decision", or a decision of letting the virtual machine VM run the method Meth, named "positive decision", according to said access control labels LabE and LabR, the instance numbers of the caller Inst_Num_CalR and the callee Inst_Num_CalE, the access policy Acc_pol, and the access permissions (read/write, for example).

In this not limited embodiment, an external decision engine Ext_dec_eng is connected to the decision engine Dec_Eng: the decision engine Dec_Eng relies on this third party access control engine Ext_dec_eng for a complementary decision. In this case, a local decision Loc_Dec is sent to the external decision engine Ext_dec_Eng, which makes an external decision Ext_Dec according to the local decision Loc_Dec. An external decision engine is particularly important for avoiding transitive information flows aiming at getting around the access policy. In other words, the external decision engine Ext_dec_eng controls indirect access violations. This is possible thanks to the cooperation between the decision engine Dec_Eng and the external decision engine Ext_dec_eng.

The following use case illustrates this situation. This use case involves two Java objects, Admin and User, and a confidential data "secret". The aim is to ensure Admin's object confidentiality regarding User's object, thanks to the labeling policy. Access control policy Acc_pol allows method invocation from Main to Admin and User. As a consequence, without an external decision engine Ext_dec_Eng, direct information flow from Admin to Main and from Main to User are allowed, but not from Admin to User directly. Indeed, method invocation between Admin and User is denied by default by the access policy Acc_pol. The external decision engine Ext_dec_eng permits to avoid User getting the secret via Main, by monitoring all information flows between instances of objects.

In a step 5, if the decision Dec is positive, that is to say the decision engine Dec_eng grants the method Meth invocation according to the access policy Acc_pol, the reference monitor Ref_mon is requested to leave the virtual machine VM to run the invoked method Meth. On the contrary, if the decision Dec is negative, that is to say the decision engine Dec_Eng does not grant the method invocation, the reference monitor Ref_mon is requested to raise a virtual machine exception to block the method Meth invocation.

It is to be noted that, in case of an access request to a variable member instead of a method invocation, a positive decision means that access is granted, and a negative decision means that access is refused.

It is to be noted that, in a not limited embodiment of the invention, the information about the invoked method Meth, the information about the caller CalR and the caller CalE, for example their language types Typ_CalE, Typ_CalR, and their access control labels LabE and LabR, their instances numbers Inst_Num, and the decisions made Loc_Dec, Ext_Dec, are recorded by the trace engine Tr_eng in an external database Tr_database. More particularly, the tracing engine Tr_eng checks from policy if the method Meth has to be logged or not. If yes, extracted information are formatted as an access request and a trace log is created.

A first implementation, named SEJava, of this MAC model dedicated to a Java Virtual Machine has been tested. SEJava controls every information flow between two Java objects (class or class instance) by mediating each method invocation and field access. Security contexts are based on Java objects and labeling mechanism relies on Java objects type signature (see Java specifications from Oracle for details about Java's type signatures). SEJava has been implemented on the OpenJDK's Java Virtual Machine using JVMTI specifications, that is to say without patching the JVM internals. JVMTI is a standard Java API form Oracle enabling to instrument a compatible virtual machine and which is mainly used for profiling purposes. The JVMTI has been tuned to be used as an Anderson's reference monitor in order to invoke SEJava's engine for all method invocations. This engine checks if the method invocation satisfies the SEJava security policy. The use of a standard instrumentation interface (here JVMTI) eases the implementation of the reference monitor within the virtual machine.

In contrast with JAAS that controls mainly the flows between the methods and the external resources (for example files), SEJava enables to:
Control the flows between all the Java objects;
May learn the required security policy during a "learning" phase, before the "access control enforcing" phase;
Connect SEJava with an external reference monitor, for example PIGA. PIGA is detailed in:
  J. Briffaut, "Formalisation et garantie de propriétés de sécurité système: application à la détection d'intrusions", thèse de doctorat d'informatique, soutenue le 13 décembre 2007, LIFO Université d'Orléans, France.
  J. Briffaut, C. Toinard, M. Peres, "A dynamic End-to-End Security for Coordinating Multiple Protections within a Linux Desktop", workshop on Collaboration and Security (Colsec 2010), in the proceedings of the 2010 International Symposium on Collaborative Technologies and Systems (CTS 2010), USA.

On a real product, the Security modeling will be assisted, based on runtime observations of the software. The default and initial labeling will be based the leaves of the Java types hierarchy of the application. Each type will be assigned its unique Security context, allow observing the information flow between all instances of objects of different types. This is already the case in the current SEJava implementation.

The result will be displayed to the people responsible for creating the Security model for this application. The user can choose to join or split existing security context. He will also choose what are allowed and forbidden information, thus creating Access Control rules.

A second implementation, named SEDalvik, has been tested. The only difference in this implementation, based on the same security model as described above, is that it has been written as integrated into the virtual machine interpreter and debugger. It was possible because the language used, Java (the security model) is the same, even if the VM bytecode is different.

To conclude, the method provides an efficient isolation mechanism for the Java application. Indeed, most advanced security features available for virtual machines are globally based on data tainting, virtual machine deep inspection of interpreter state of virtual machine program analysis. But most of them are not able to perform real-time virtual machine program enforcement with dynamic policy.

Additionally, current security features for virtual machines impose developers and/or administrators to provide a specific security policy for each program to run. The method 100 enables to compute dynamically the security contexts and the required rules. First, the security contexts are derived from the class naming convention, that is to say signatures. Secondly, the reference monitor Ref_mon audits all the method calls. Thus, the method 100 enables to transform all the denied calls into SEJava rules.

Is it important to notice that:

Having the source code of the application is not required;

It is not required to modify the source code to observe information flows,

The virtual machine does not requires modifications (depending on JVMTI support) thus the proposed method and its implementation is applicable to pre-existing applications or software products.

There are three enhancements regarding existing solution:

The control of the information flow is carried out between all Java objects;

the solution does not require any code preprocessing, analysis, or any instrumentation;

defined policy is fully applicable to new programs and/or can be directly learned.

The invention claimed is:

1. A method for ensuring Mandatory Access Control in a virtual machine adapted for running object oriented programs and based on strongly typed language, by means of a mandatory access control module, said method comprising:

configuring the mandatory access control module with an access policy upon reception of an event indicating a launch or an initialization of the virtual machine wherein events are standardized instrumentation oriented events which activate callback functions;

upon event reception indicating a method invocation or an access request to a variable member, adding an access control label to an object calling the method or requesting access, named "caller", and the object called by the method or whose access is requested, named "callee", according to the caller and callee language types;

making a decision of blocking execution of the method or the access to the variable member, named "negative decision", or a decision of letting the virtual machine run the method or access the variable member, named "positive decision", according to said access control labels, instance numbers of the caller and the callee, the access policy, and access permissions;

transmitting said decision to the virtual machine for blocking or granting the execution of the requested method or the access to the variable member.

2. The method according to claim 1, wherein the step of configuring the mandatory access control module further comprises the step of loading a label policy file defining correspondences between language types and access control labels, and the step of adding a label is realized by means of said label policy file.

3. The method according to claim 1, wherein the step of adding an access control label further comprises using an external database comprising correspondences between object instances and access control labels.

4. The method according to claim 1, wherein the step of making a decision further comprises cooperation between the mandatory access control module and an external decision engine.

5. The method according to claim 1, further comprising the step of recording in an external database:

information about the invoked method;

information about the caller and the callee, including at least one of their language types, their access control labels, or their instances numbers;

the decision made.

6. The method according to claim 1, further comprising the step of raising an exception by the virtual machine in case of negative decision, for blocking the execution of the requested method or the access to the variable member.

7. A mandatory access control module further comprising a memory, for ensuring Mandatory Access Control in a virtual machine adapted for running object oriented programs and based on strongly typed language, said mandatory access control module configured with an access policy upon reception of an event indicating a launch or an initialization of the virtual machine wherein events are standardized instrumentation oriented events which activate callback functions, comprising:

a reference monitor stored in the memory, which is a mandatory path for a method invocation and variable member access, adapted for transmitting a decision to the virtual machine of blocking execution of said method or said access to the variable member, named "negative decision", or a decision of letting the virtual machine run said method or access said variable member, named "positive decision";

a labeling engine stored in the memory adapted for adding an access control label to an object calling the method or requesting the access, named "caller", and the object called by the method or whose access is requested, named "callee", according to caller and callee language types; and a decision engine stored in the memory adapted for making said decision, according to said labels, instance numbers of the caller and the callee, and an access policy.

8. The mandatory access control module according to claim 7, wherein the mandatory access control module is a module partially external to the virtual machine, named instrumentation module, adapted for communicating with the virtual machine via standard protocols and a standard instrumentation interface.

9. The mandatory access control module according to claim 8, wherein the labeling engine is adapted for communicating with the virtual machine for requiring the caller and callee language types.

10. The mandatory access control module according to claim 7, wherein the label engine is adapted for communicating with an external database comprising correspondences between object instances and access control labels.

11. The mandatory access control module according to claim 7, wherein the decision engine is adapted for communicating with an external decision engine, and waiting for an external decision from the external decision engine to make a positive or a negative decision.

12. The mandatory access control module according to claim 7, further comprising a trace engine adapted for recording information about the invoked method, for example language types and access control labels of the caller and the callee, their instances numbers, and the decision made, in an external database.

13. A virtual machine comprising a mandatory access control module according to claim 7.

* * * * *